United States Patent
De Jong et al.

(10) Patent No.: US 8,961,092 B2
(45) Date of Patent: Feb. 24, 2015

(54) DEVICE FOR RETAINING AN ATTACHED PART ON A CARRIER PART AND ARRANGEMENT HAVING SUCH A DEVICE AND HAVING AN ATTACHED PART

(75) Inventors: Michael De Jong, Binzen (DE); Jens Breitenfeld, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 183 days.

(21) Appl. No.: 13/812,391

(22) PCT Filed: Jul. 12, 2011

(86) PCT No.: PCT/EP2011/061876
§ 371 (c)(1),
(2), (4) Date: Jan. 25, 2013

(87) PCT Pub. No.: WO2012/022545
PCT Pub. Date: Feb. 23, 2012

(65) Prior Publication Data
US 2013/0243523 A1    Sep. 19, 2013

(30) Foreign Application Priority Data

Aug. 20, 2010  (DE) .......................... 10 2010 035 011

(51) Int. Cl.
*F16B 19/00*  (2006.01)

(52) U.S. Cl.
USPC .......................... 411/508; 280/728.2; 24/295

(58) Field of Classification Search
USPC ................. 411/508, 45, 48; 280/728.2, 730.2
IPC .................................................. F16B 19/1081
See application file for complete search history.

(56) References Cited

U.S. PATENT DOCUMENTS

| | | | | |
|---|---|---|---|---|
| 5,788,268 A | * | 8/1998 | Goss et al. | 280/728.2 |
| 5,850,676 A | * | 12/1998 | Takahashi et al. | 24/297 |
| 6,752,576 B2 | * | 6/2004 | Johansson et al. | 411/21 |
| 6,955,514 B2 | * | 10/2005 | Hoshi | 411/508 |
| 7,267,361 B2 | * | 9/2007 | Hofmann et al. | 280/728.2 |
| 7,637,527 B2 | * | 12/2009 | Mazanek et al. | 280/728.2 |
| 8,297,646 B2 | | 10/2012 | Aoki et al. | |
| 2004/0052575 A1 | | 3/2004 | Draggoo et al. | |
| 2005/0225061 A1 | * | 10/2005 | Hofmann et al. | 280/728.2 |
| 2009/0020986 A1 | * | 1/2009 | Baumgartner et al. | 280/728.2 |

(Continued)

FOREIGN PATENT DOCUMENTS

| | | |
|---|---|---|
| DE | 102007042873 B3 | 10/2008 |
| DE | 102007045296 B3 | 12/2008 |

(Continued)

OTHER PUBLICATIONS

International Search Report and Written Opinion dated Oct. 17, 2011 in related International Application No. PCT/EP2011/061876.

(Continued)

*Primary Examiner* — Gary Estremsky
(74) *Attorney, Agent, or Firm* — Faegre Baker Daniels LLP

(57) ABSTRACT

A device for retaining an attached part on a carrier part, including a clip part and an unlocking part displaceably supported in the clip part. In a release position of the unlocking part, latching legs of the clip part engage behind the carrier part while, in a dismantling position of the unlocking part, the latching legs are not engaged with the carrier part so that the attached part can be removed from the carrier part.

13 Claims, 6 Drawing Sheets

(56) References Cited

U.S. PATENT DOCUMENTS

2009/0242715 A1* 10/2009 Kosidlo et al. ........... 248/231.81
2010/0295272 A1 11/2010 Aoki

FOREIGN PATENT DOCUMENTS

| EP | 2090475 | A1 | 8/2009 |
|---|---|---|---|
| GB | 2364973 | A | 2/2002 |
| WO | WO2009/063715 | A1 | 5/2009 |
| WO | WO2012/022568 | A1 | 2/2012 |

OTHER PUBLICATIONS

International Search Report and Written Opinion dated Nov. 3, 2011 in International Application No. PCT/EP2011/062390.

* cited by examiner

DEVICE FOR RETAINING AN ATTACHED PART ON A CARRIER PART AND ARRANGEMENT HAVING SUCH A DEVICE AND HAVING AN ATTACHED PART

CROSS-REFERENCE TO RELATED APPLICATIONS

This application is a U.S. National Phase Patent Application based on International Application No. PCT/EP2011/061876 filed Jul. 12, 2011, which claims priority to German Patent Application No. 10 2010 035 011.7 filed Aug. 20, 2010, the entire disclosures of which are hereby explicitly incorporated by reference herein.

BACKGROUND OF THE INVENTION

1. Field of the Invention

The present invention relates to a device for retaining an add-on part on a support part. The invention further concerns an arrangement having such a device and having an add-on part.

2. Description of the Related Art

One known device is disclosed in EP 2 090 475 A1. The prior device for retaining an add-on part on a support part in a mounted position and in a protracted position comprises a clip part provided, at a foot end, with snap arms for engaging with a support part. The clip part is further equipped with a fixing assembly formed at a distance from the foot end and operative to engage with an add-on part, and comprises a stop device that retains the add-on part in a protracted position that is farther from the support part than the mounted position.

SUMMARY OF THE INVENTION

The present invention provides a device and an arrangement for retaining an add-on part on a support part, which enable the clip part to be removed relatively easily from the support part if an add-on part is in a protracted position that is farther from the support part than a mounted position.

Owing to the presence of an unlocking part that is displaceably mounted in the clip part and comprises a demounting device which, with said unlocking part in a demounting position, serves to cancel an engagement of the snap arms of the clip part with the support part, the clip part can be very easily removed from the support part when the unlocking part is shifted from a release position to a demounting position after cancellation of the engagement of the snap arms with the support part.

In one form thereof, the present invention provides a device for retaining an add-on part on a support part in a mounted position and in a protracted position, including a clip part, which includes snap arms configured at a foot end and operative to engage with a support part equipped with a fixing arrangement configured at a distance from the foot end and operative to engage with an add-on part, and which is provided with an abutment device that retains the add-on part in the protracted position which is farther from the support part than the mounted position, characterized in that an unlocking part is present, which is displaceably mounted in the clip part and includes a demounting device by means of which, in a demounting position of the unlocking part, an engagement of the snap arms with the support part can be cancelled.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
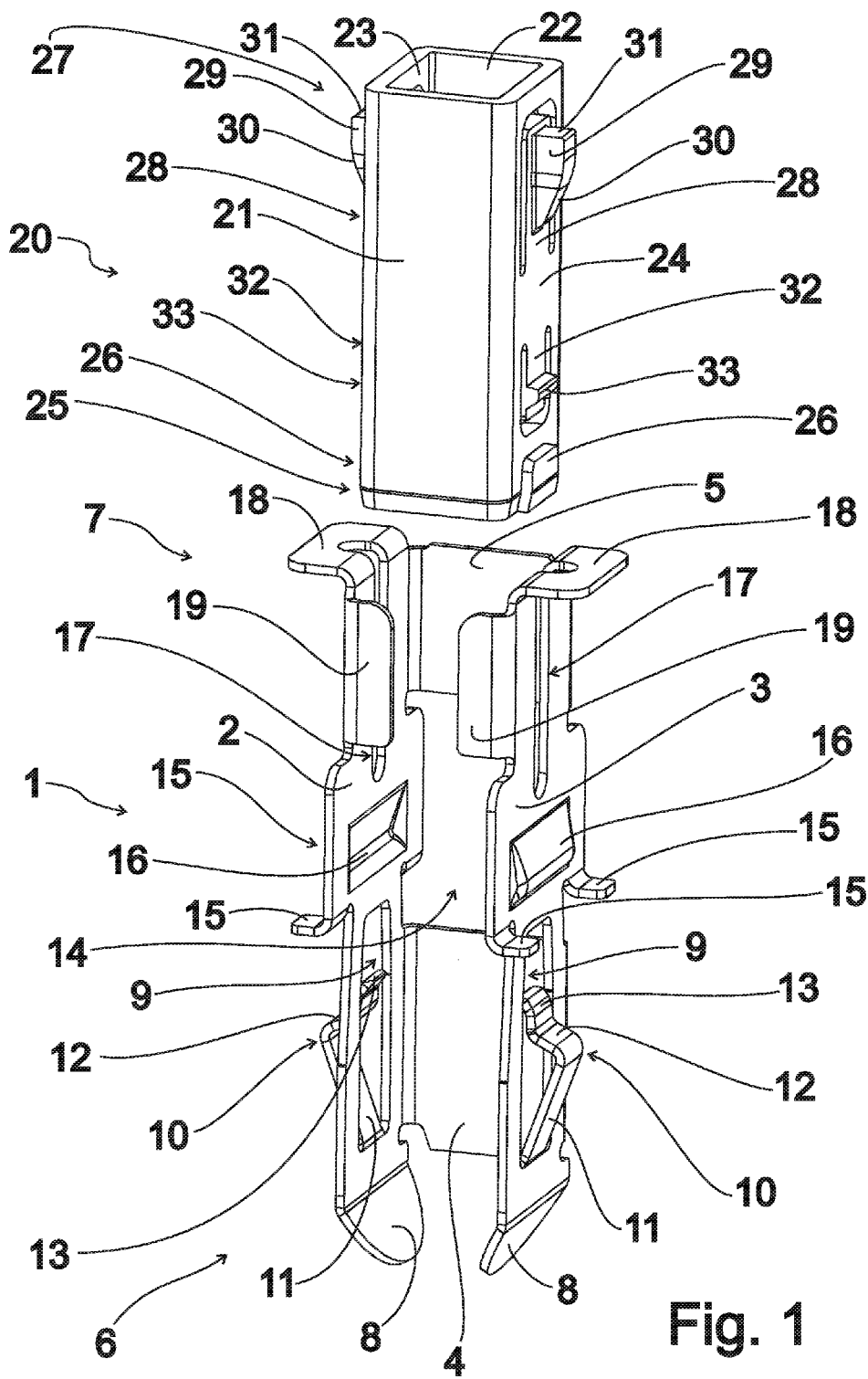
FIG. 1 is an exploded perspective view of an exemplary embodiment of a device according to the invention comprising a clip part and an unlocking part.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a device according to the invention, which is preferably equipped with an elongated clip part 1 made as a stamped and bent part from a strip of sheet metal. The clip part 1 is configured as substantially U-shaped and has a first side wall 2, a second side wall 3, which side walls 2, 3 are aligned parallel to each other, and a foot-end transverse wall 4 and a head-end transverse wall 5, which connect the side walls 2, 3 to each other respectively in the region of a foot end 6 and in the region of a head end 7.

Formed on each side wall 2, 3 in the region of the foot end 6 is a foot tongue 8 that extends away from the head end 7, the two tongues being oriented so that they point toward each other at an angle. Each side wall 2, 3 also has in the region of the foot end 6 a respective approximately rectangular clearance 9, which extends by its long side in the longitudinal direction of the clip part 1 and in which a respective snap arm 10 engages. Each snap arm 10 is connected to the particular side wall 2, 3 by a connecting portion 11 disposed on the side of the clearance 9 proximate the particular foot tongue 8 and extends from the particular side wall 2, 3 obliquely outward away from that side wall 2, 3. Each snap arm 10 is also configured with an abutment portion 12 that extends from the end of the connecting portion 11 proximate the head end 7 toward the particular side wall 2, 3 and is oriented approximately at right angles to the respective connecting portion 11. At the end of the abutment portion 12 remote from connecting portion 11, each snap arm 10 has an unlocking portion 13, which in a relaxed position of the snap arm 10, as depicted in FIG. 1, extends by a bend through the respective clearance and into an interior space 14 of the clip part 1, such that an end portion of each unlocking portion 13 is disposed on the opposite side of the particular side wall 2, 3 from the respective connecting portion 11 of a snap arm 10.

Formed on the side walls 2, 3 between the snap arms 10 and the head end 7 and oriented at right angles to the side walls 2, 3 are counter-tongues 15 extending outwardly away from the side walls 2, 3. Also configured in each side wall 2, 3, on the opposite side of each counter-tongue 15 from the snap arm 10, is a respective convex portion 16 that protrudes outward from the particular side wall 2, 3 and has one steeper flank facing the respective counter-tongue 15 and one shallower flank facing the head end 7.

On the side of each convex portion 16 facing the head end 7, each side wall 2, 3 has a guide slot 17 extending toward the head end 7 at a given distance from the particular convex portion 16. The guide slots 17 terminate in head plates 18 that are disposed at the head end 7 and are turned outward at right angles. Finally, the clip part 1 is configured at the head end 7 with stiffening tabs 19, which are disposed on the opposite edge side of each side wall 2, 3 from the head-end transverse wall 5 and extend inwardly toward each other, to stiffen the clip part 1 in the region of the guide slots 17.

The exemplary embodiment of a device according to the invention as depicted in FIG. 1 also comprises an unlocking part 20, which is preferably made from a hard-elastic synthetic material and in this exemplary embodiment is essentially in the form of a mechanically very stable, square-shaped, internally hollow sleeve. The unlocking part 20 has two mutually parallel, smooth-walled transverse walls 21, 22, at whose edge sides are disposed two edge walls 23, 24. At a foot end 25 of the unlocking part 20, which end faces toward the head end 7 of the clip part 1 in the depiction of FIG. 1, snap-in bases 26 are formed at the edge walls 23, 24, each protruding laterally outward beyond the respective edge wall 23, 24.

At a head end 27 of the unlocking part 20 disposed oppositely from the foot end 25 of the unlocking part 20, the edge walls 23, 24 comprise, formed on a first spring arm 28, an insertion stop lug 29, which on its side facing the foot end 25 of the unlocking part 20 is beveled with a ramp surface 30 and on its end facing away from the foot end 25 of the unlocking part 20 has an actuating surface 31 oriented at right angles to the respective edge wall 23, 24.

Between the snap-in bases 26 and the insertion stop lugs 29, the unlocking part 20 has at each edge wall 23, 24 a second spring arm 32, which extends away from the first spring arm 28 and at its opposite end from the particular snap-in base 26 is configured with an extraction stop lug 33, which, like the insertion stop lug 29, extends outwardly beyond the particular edge wall 23, 24.

Figure 2:
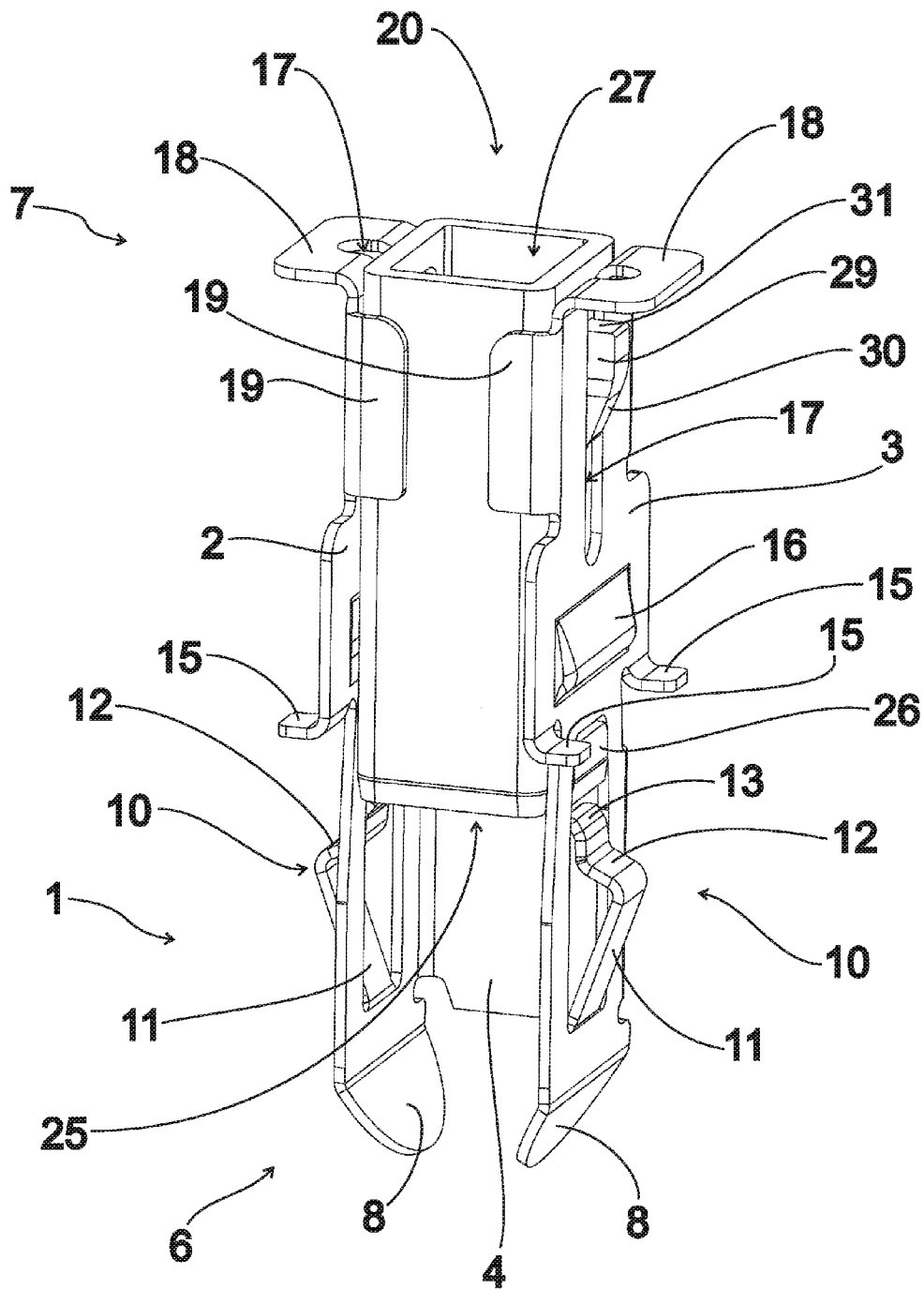
FIG. 2 is a perspective view of the exemplary embodiment according to FIG. 1 with the unlocking part in a release position in which it is pushed into in the clip part.

FIG. 2 is a perspective view of the exemplary embodiment according to FIG. 1 with the unlocking part 20 in an arrangement in which it is inserted as intended in the clip part 1. In the representation of FIG. 2, the unlocking part 20 is in a release position in which the foot end 25 of the unlocking part 20 is spaced apart from the unlocking portions 13 of the snap arms 10. In the release position of the unlocking part 20, the extraction stop lugs 33 are disposed in the convex portions 16, while the snap-in bases 26 are in the region of the ends of the clearances 9 proximate the convex portions 16 and the insertion stop lugs 29 are disposed in the guide slots 17 in the region of their ends directed toward the head plates 18. It is evident from FIG. 2 that the outer contour of the unlocking part 20 is so adapted to the shape of the interior space 14 of the clip part 1 that the unlocking part 20 is arranged so that it can slide in the interior space 14 essentially without play and is additionally guided by the stiffening tabs 19.

Figure 3:
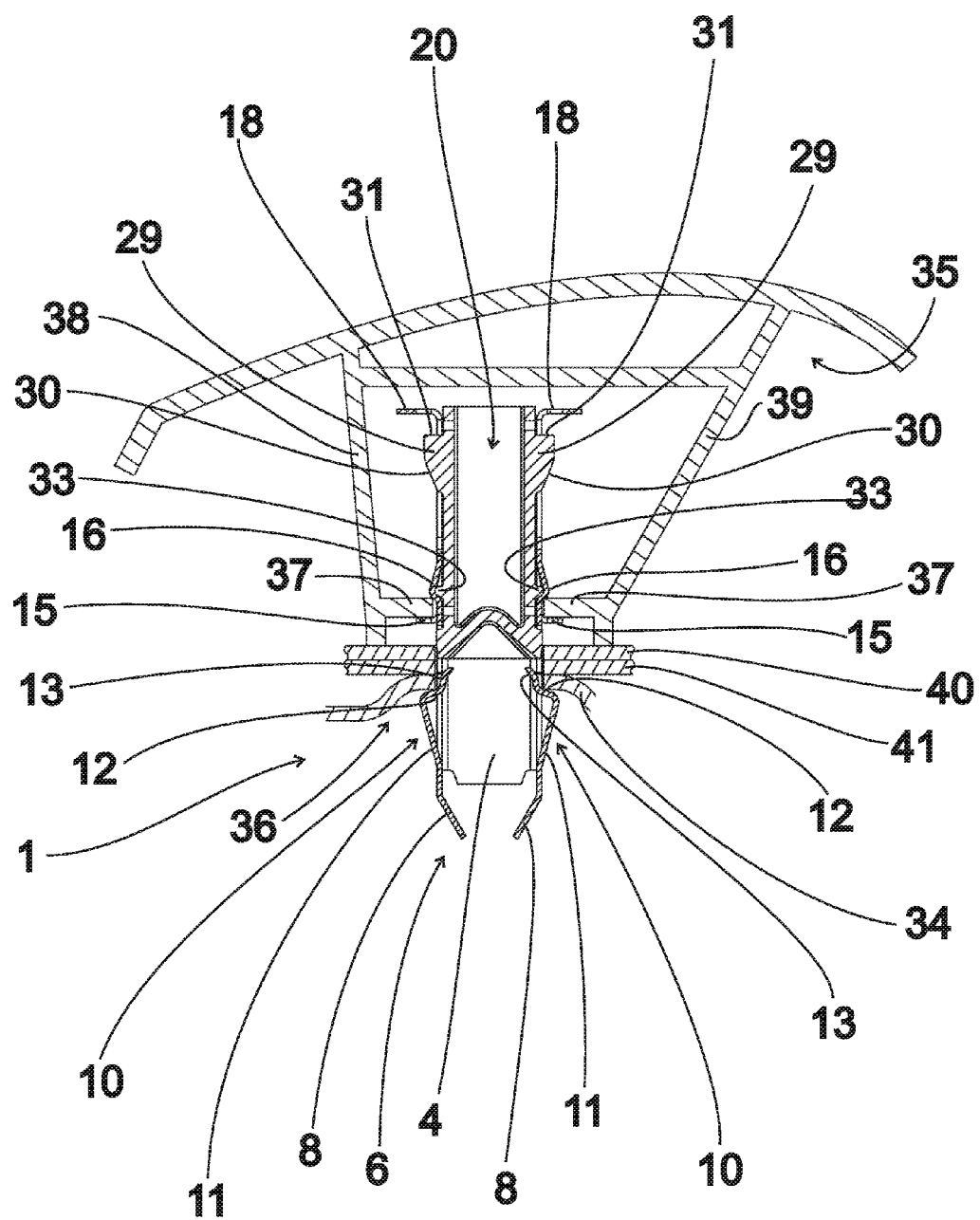
FIG. 3 is a sectional view of the exemplary embodiment according to FIG. 1 with the unlocking part in the release position according to FIG. 2, retaining an add-on part in a mounted position on a support part.

FIG. 3 is a sectional view of the exemplary embodiment of a device according to the invention as depicted in FIG. 1 with the unlocking part 20 in the release position according to FIG. 2, in which the clip part 1 is in engagement with a support part 34 and with an add-on part 35. The engagement with the support part 34 is effected by means of the snap arms 10, whose abutment portions 12 engage behind the rim of a support part opening 36 provided in the support part 34 and through which the clip part 1 has been inserted in advance, compressing the snap arms 10. The engagement with the add-on part 35 is effected by means of, as fixing means, fixing webs 37 formed on the add-on part 35, which are configured to point toward each other on outer walls 38, 39 of the add-on part 35 and against which the counter-tongues 15 and the convex portions 16, as a fixing arrangement, abut externally.

It can be understood from the representation of FIG. 3 that disposed between the ends of the outer walls 38, 39 directed toward the support part 34 and the side facing toward the add-on part 35 are a flexible fabric layer 40, for example an air bag, and a flexurally rigid backing layer 41, which in the mounted position of the add-on part 35 are fastened on the support part 34 and through which the clip part 1 also engages.

Figure 4:
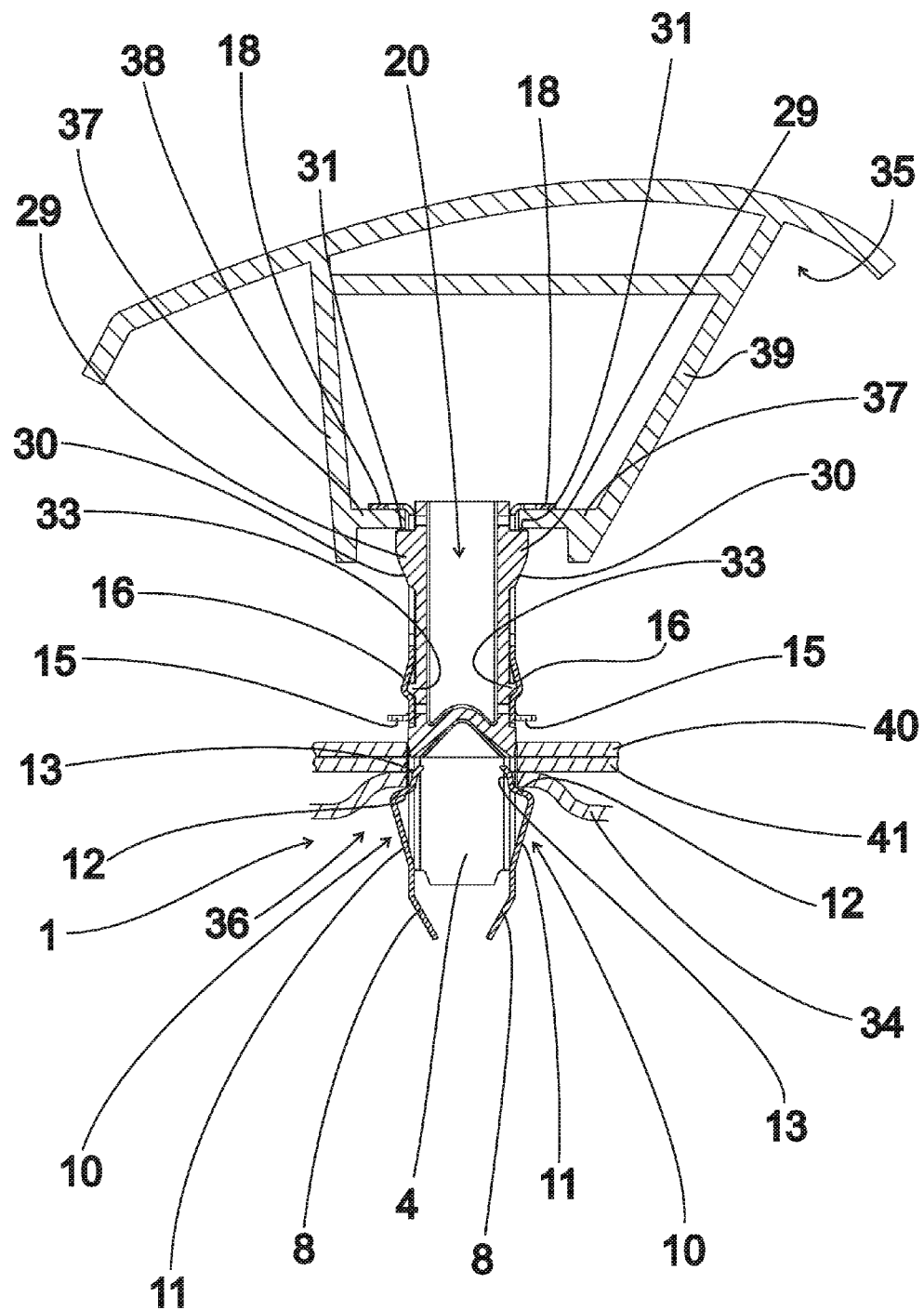
FIG. 4 is a sectional view of the arrangement according to FIG. 3 with the add-on part in a protracted position in which the add-on part is farther from the support part than it is in the mounted position of FIG. 3.

FIG. 4 shows the arrangement according to FIG. 3 with the add-on part 35 in a protracted position at a distance from the support part 34, a position that is typically assumed after the inflation of an air bag with corresponding movement of the fabric layer 40 away from the support part 34, cancelling the engagement of the fixing webs 37 with the counter-tongues 15 and the convex portions 16. In the protracted position, the fixing webs 37 are in abutment with the head plates 18 acting as an abutment device, with the result that the add-on part 35 continues to be connected to the support part 34 and is retained thereon at a greater distance from it than in the mounted position.

Figure 5:
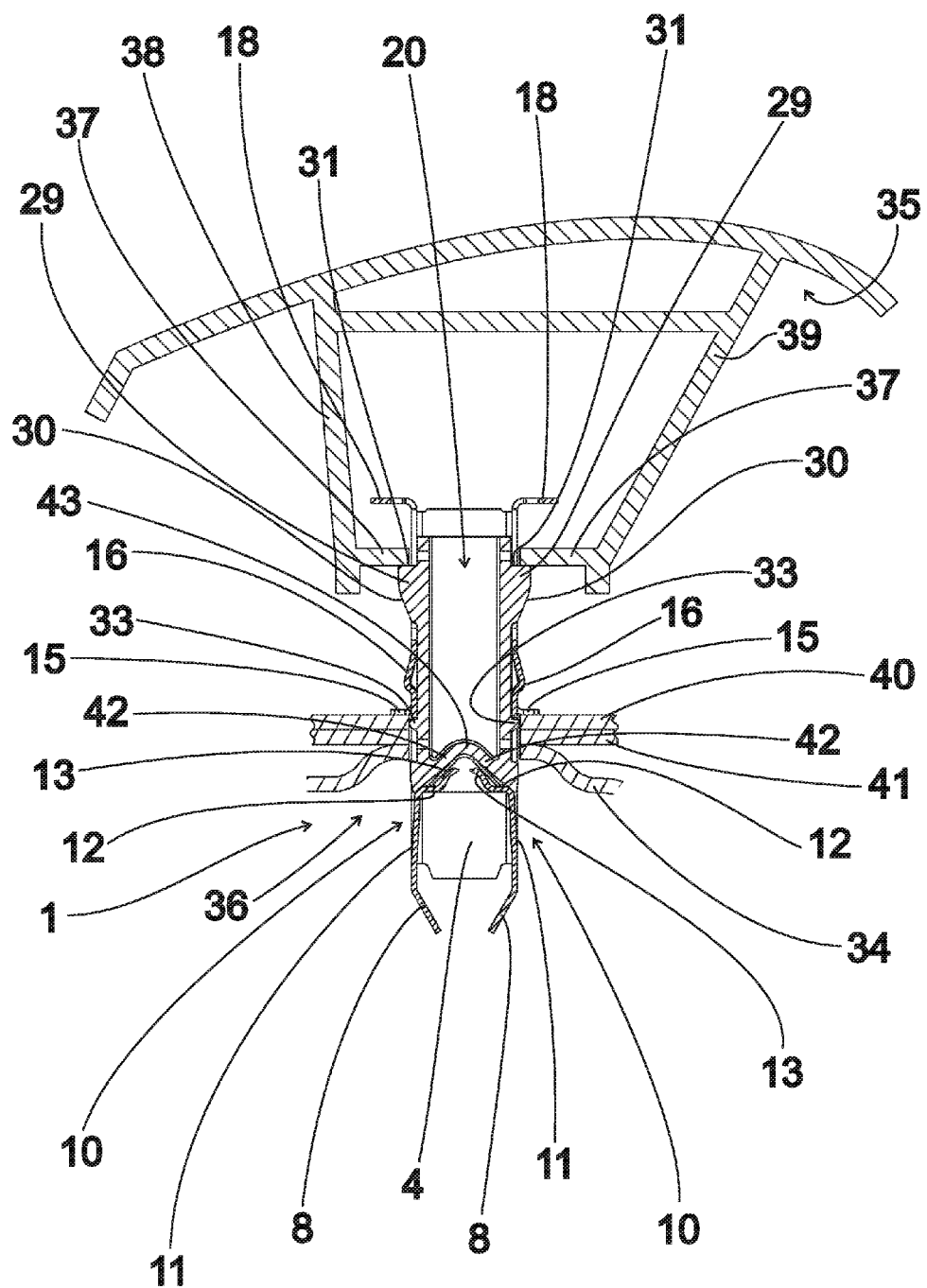
FIG. 5 is a sectional view of the arrangement according to FIG. 4 with the unlocking part in a demounting position.

FIG. 5 shows the arrangement according to FIG. 4 after movement of the add-on part 35 toward the support part 34 and the accompanying abutment of the fixing webs 37 against the actuating surfaces 31, with the result that the unlocking part 20, upon release of the engagement of the extraction stop lugs 33 with the convex portions 16, is pushed in toward the foot end 6 of the clip part 1 so far that the extraction stop lugs 33 are disposed in the clearances 9. During this movement into a demounting position, the snap arms 10 are moved so far radially inward by the abutment of the unlocking portions 13 against inclined ramp walls 42 of an unlocking dome 43, which are disposed as a demounting device at the foot end 25 of the unlocking part 20 and which extend obliquely from the ends of the edge walls 23, 24 located at the foot end 25 of the unlocking part 20 toward the head end 27 of the unlocking part 20, that the connecting portions 11 lie substantially flush with the side walls 2, 3 and are retained in that position.

Figure 6:
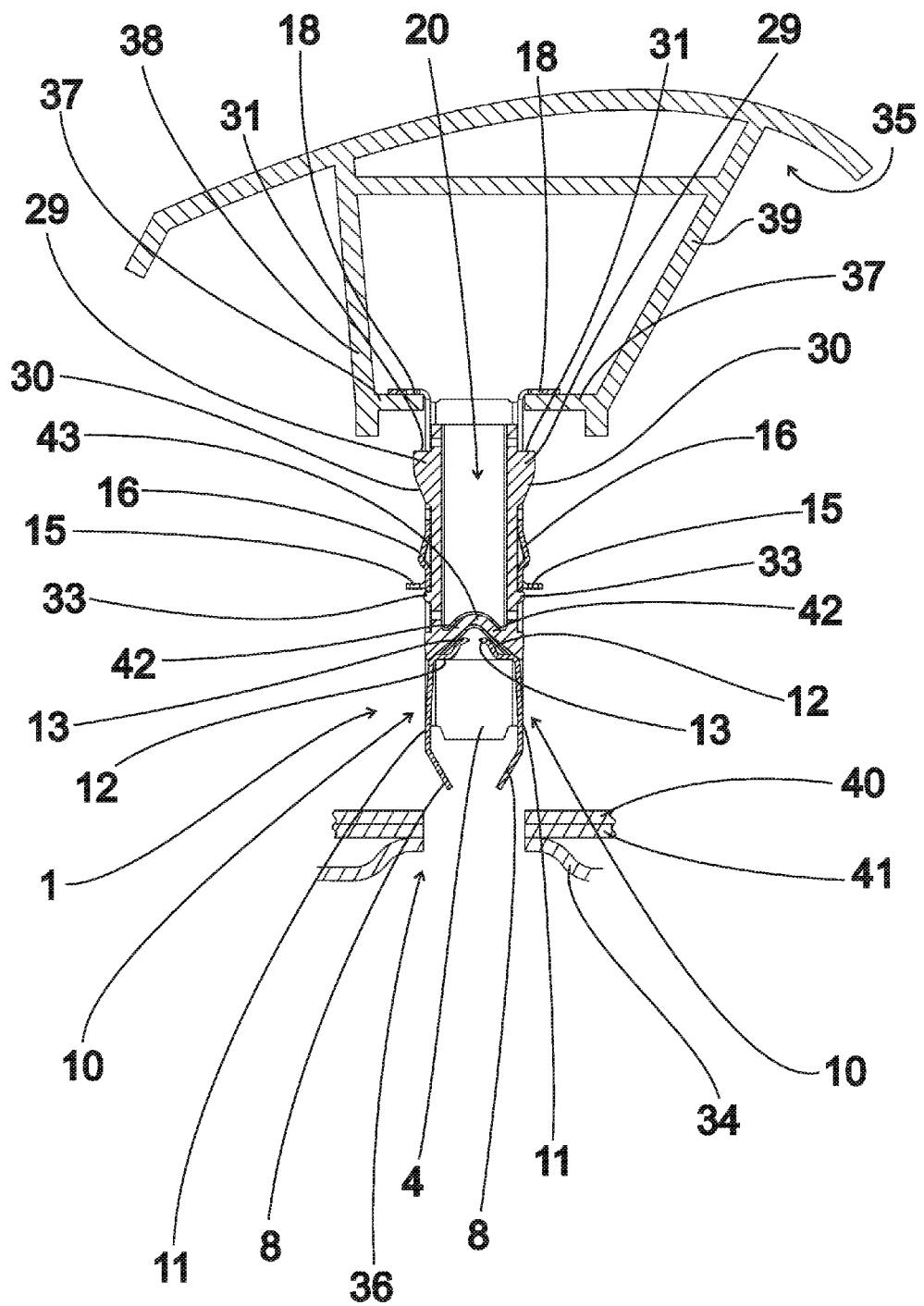
FIG. 6 is a sectional view of the arrangement according to FIG. 5 with a clip part extracted from the support part.

FIG. 6 is a sectional view of the arrangement according to FIG. 5 after the extraction of the clip part 1 from the support part 34. The extraction of the clip part 1 from the support part 34 takes place as follows: starting with the arrangement shown in FIG. 5, the add-on part 35 is removed from the support part 34, thus bringing the fixing webs 37 into abutment against the head plates 18, the snap arms 10 being held fixed by the unlocking part 20 in a retracted position, and the clip 1 can then be extracted from the support part opening 36 with essentially no resistance.

After the cancellation of the engagement of the extraction stop lugs 33 from the clearances 9, the unlocking part 20 can be shifted from the demounting position shown in FIG. 5 and FIG. 6 back to the release position according to FIG. 2, FIG. 3 and FIG. 4, and the add-on part 35 can thus be returned to the mounted position according to FIG. 3.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for retaining an add-on part on a support part in a mounted position and in a protracted position, said device comprising:
   a clip part including snap arms disposed at a foot end of said clip part and operative to engage with the support part, a fixing arrangement disposed at a distance from said foot end and operative to engage with an add-on part, and an abutment device retaining the add-on part in the protracted position, the add-on part disposed farther from the support part in the protracted position than in the mounted position; and
   an unlocking part displaceably mounted in said clip part, said unlocking part including a demounting device operable to cancel an engagement of said snap arms with the support part in the demounting position of said unlocking part;
   wherein said clip part includes two side walls and at least one transverse wall connecting said side walls; and
   wherein each said snap arm is disposed in a clearance of a side wall and includes a splayed connecting portion connected to a respective said side wall, an abutment portion oriented at an angle to said connecting portion, and an unlocking portion extending at least partially inside a respective said side wall.

2. The device of claim 1, wherein said clip part further comprises at least one counter-tongue connected to a side wall and protruding outwardly from said side wall, said counter-tongue disposed between said abutment portion and a head end of said clip part.

3. The device of claim 2, wherein said clip part further comprises at least one convex portion protruding outwardly from a respective side wall, each convex portion disposed between a said counter-tongue and said head end.

4. The device of claim 3, wherein said clip part is provided at said head end thereof with head plates that are turned outward laterally.

5. The device of claim 4, wherein said clip part further comprises an elongated guide slot disposed in each said side wall between said convex portions and said head plates.

6. The device of claim 1, wherein said unlocking part is formed as a sleeve disposed between said side walls.

7. The device of claim 6, wherein said unlocking part further comprises a head end and a foot end, and edge walls facing toward said side walls of said clip part, each said edge wall further comprising a snap-in base disposed adjacent said foot end, an insertion stop lug disposed adjacent said head end, and an extraction stop lug disposed between said snap-in base and said insertion stop lug.

8. The device of claim 7 wherein, in a release position of said unlocking part, said insertion stop lugs are disposed in said guide slots, said extraction stop lugs are disposed in said convex portions, and said snap-in bases are disposed in said clearances.

9. The device of claim 8 wherein, in the demounting position of said unlocking part, said insertion stop lugs are disposed in said guide slots and said extraction stop lugs and said snap-in bases are disposed in said clearances.

10. The device of claim 7, wherein said unlocking part includes inwardly disposed, inclined ramp walls proximate said foot end, said ramp walls engagable with said snap arms when said unlocking part is shifted from a release position to the demounting position.

11. The device of claim 6, wherein said unlocking part is made from a hard-elastic synthetic material.

12. A device for retaining an add-on art on a support part in a mounted position and in a protracted position, said device comprising:
   a clip part including snap arms disposed at a foot end of said clip part and operative to engage with the support part, a fixing arrangement disposed at a distance from said foot end and operative to engage with an add-on part, and an abutment device retaining the add-on part in the protracted position, the add-on part disposed farther from the support part in the protracted position than in the mounted position; and
   an unlocking part displaceably mounted in said clip part, said unlocking part including a demounting device operable to cancel an engagement of said snap arms with the support part in the demounting position of said unlocking part;
   in combination with an add-on part comprising fixing means which, in the mounted position, are in engagement with said clip part and by means of winch said unlocking part can be moved into the demounting position.

13. The device of claim 12, wherein said fixing means are engagable with insertion stop tugs disposed on said unlocking part.

* * * * *